United States Patent [19]

Hager et al.

[11] Patent Number: 5,247,661
[45] Date of Patent: Sep. 21, 1993

[54] METHOD AND APPARATUS FOR AUTOMATED DOCUMENT DISTRIBUTION IN A DATA PROCESSING SYSTEM

[75] Inventors: Dean J. Hager; Curtis G. Rose, both of Rochester, Minn.

[73] Assignee: International Business Machines Corporation, Armonk, N.Y.

[21] Appl. No.: 579,864

[22] Filed: Sep. 10, 1990

[51] Int. Cl.$^5$ ............................................. G06F 15/40
[52] U.S. Cl. ................................ 395/600; 364/225.3; 364/225.4; 364/DIG. 2; 364/419.19; 395/145
[58] Field of Search ................ 395/600, 500, 100; 364/513, 419, 145; 380/25

[56] References Cited

U.S. PATENT DOCUMENTS

| | | | |
|---|---|---|---|
| 4,503,516 | 3/1985 | Agnew et al. | 364/900 |
| 4,509,122 | 4/1985 | Agnew et al. | 395/500 |
| 4,849,883 | 7/1989 | Mitchell et al. | 395/101 |
| 4,884,217 | 11/1989 | Skeirik et al. | 364/513 |
| 4,899,299 | 2/1990 | MacPhail | 364/570 |
| 4,962,532 | 10/1990 | Kasiraj et al. | 380/25 |
| 5,018,191 | 5/1991 | Catron et al. | 379/100 |
| 5,051,891 | 9/1991 | MacPhail | 395/600 |
| 5,057,935 | 10/1991 | Williams | 358/402 |
| 5,063,495 | 11/1991 | MacPhail | 395/650 |
| 5,089,956 | 2/1992 | MacPhail | 395/600 |
| 5,093,901 | 3/1992 | Cree et al. | 395/100 |
| 5,101,345 | 3/1992 | MacPhail | 395/600 |
| 5,107,419 | 4/1992 | MacPhail | 395/600 |
| 5,115,326 | 5/1992 | Burgess et al. | 358/440 |
| 5,162,992 | 11/1992 | Williams | 364/419 |
| 5,181,162 | 1/1993 | Smith et al. | 364/419 |

OTHER PUBLICATIONS

DeSousa, M. R. "Electronic information interchange in an office environment", *IBM Syst. Jour.*, vol. 20, No. 1, 1981, pp. 4-23.

Schick et al. "The Document Interchange Architecture: A member of a family of architectures in the SNA environment", *IBM Syst. Jour.*, vol. 21, No. 2, 1982, pp. 220-246.

*Primary Examiner*—Thomas C. Lee
*Assistant Examiner*—Paul Lintz
*Attorney, Agent, or Firm*—Andrew J. Dillon

[57] ABSTRACT

The method and apparatus of the present invention permit the automated distribution of an electronic document to a preselected list of recipients. A selected document is identified and a document profile is selected or created, including an identification of the technical or functional area disclosed within that document. An examination of the document profile is then utilized to determine a preselected group of recipients and the document is automatically transmitted to those recipients. In one embodiment of the present invention, the creator of each document is prompted to select one or more functional areas from a predetermined list of functional areas during the creation of a document. In still another embodiment, the functional area of a document is automatically established in response to an examination of the department number, division, building, laboratory group, et cetera associated with the creator or creators of the document.

3 Claims, 6 Drawing Sheets

| INVENTION DISCLOSURE DOCUMENT | | | | | | |
|---|---|---|---|---|---|---|
| Full Names of Inventors | Emp. Ser.# | Div/ Dept. | Bldg. Zip | Location | Tel. No. | FOR USE BY PATENT OPERATIONS Disclosure No. |
| | | | | | | |
| | | | 96 | | | |
| | | | | | | Patent Attorney |
| | | | | | | |
| | | | | | | |
| Title of invention (Short & Descriptive) 114 | | | | | | Evaluator |
| Problem Solved By This Invention (Summary) 116 | | | | | | Functional Code |

(Y/N) (mm/dd/yy) Where:
Public Demonstration or Use? ___  / /  ___

Disclosed outside Company? ___  / /  ___
If so, under CDA ___

Used in Manufacturing? ___  / /  ___
If so, Product Name ___

If additional information becomes available, or if dates are changed, advise Evaluation Facility immediately.

*Fig. 4A*

| FUNCTIONAL AREA CODES | | | |
|---|---|---|---|
| 102 → Please select one functional area for each inventor: ~40 | | | |
| 104 → CODE | DECRIPTION ~106 | CODE ~108 | DESCRIPTION |
| 01 | Programming Lab | 08 | Integrated Technology |
| 02 | Vendor Files | 09 | Processor Development |
| 03 | Manufacturing | 10 | Engineering Planning |
| 04 | Systems Product Assurance | 11 | Entry Systems |
| 05 | Operations | 12 | System Structure |
| 06 | J. Jones Group | 13 | Circuit Tech |
| 07 | Automation Technology | 14 | Hi-Perf. Sys. & Tech. Dev. |
| | 112 / 00=None of the Above | | |

METHOD AND APPARATUS FOR AUTOMATED DOCUMENT DISTRIBUTION IN A DATA PROCESSING SYSTEM

CROSS REFERENCE TO RELATED APPLICATION

This application is related to U.S. patent application Ser. No. 07/580,336, entitled "Method and Apparatus for Electronic Corroboration of Documents in a Data Processing System" and U.S. patent application Ser. No. 07/579,825, entitled "Method and Apparatus for Automated Procedure Initiation in a Data Processing System," now pending and U.S. patent application Ser. No. 07/579,473, entitled "Method and Apparatus for Automated Meeting Agenda Generation in a Data Processing System," now pending, all filed of even date herewith and assigned to assignee hereof, and incorporated herein by reference thereto.

BACKGROUND OF THE INVENTION

1. Technical Field

The present invention relates in general to an improved data processing system and in particular to a method and system for automatically distributing an electronic document within a data processing system. Still more particularly, the present invention relates to a method and system for automatically distributing an electronic document within a data processing system in response to a determination of a functional area associated with said document.

2. Description of the Related Art

The modern electronic office is rapidly supplanting and replacing many aspects of the traditional paper office. Modern office systems utilize electronic mail, voice mail, centralized databases, and other forms of electronic communication to decrease the amount of so-called "float" encountered in a traditional paper society. By utilizing electronic mail it is possible for a document to be simultaneously transmitted to multiple recipients at various points around the world.

Despite the advent of widespread electronic communication, selected activities within the traditional paper office have been difficult to implement in an electronic society. For example, the distribution of electronic documents in known electronic offices must be accomplished by manually entering a desired list of recipients and thereafter transmitting the electronic document to the listed recipients. Groups of desired recipients may be preselected and listed together; however, manual selection of a group of recipients is still required.

In selected applications it is often desirable to automatically transmit an electronic document to a predetermined list of recipients. For example, invention disclosure documents must generally be evaluated to determine whether or not the invention described therein merits the filing of a patent application, a publication of the material contained therein or the closing of the file which contains the disclosure. In such instances, it is necessary and desirable to transmit these invention disclosure documents to one or more skilled evaluators who are knowledgeable in a specific functional area, in order to obtain an accurate evaluation.

In addition to invention disclosures many companies now encourage employees to submit written suggestions to cut costs or otherwise improve the efficiency of the company. These suggestions must also be routed to one or more skilled evaluators for appraisal.

It should therefore be apparent that a need exists for a method and system whereby electronic documents stored within a data processing system may be automatically distributed to a preselected list of recipients.

SUMMARY OF THE INVENTION

It is therefore one object of the present invention to provide an improved data processing system.

It is another object of the present invention to provide an improved data processing system which permits the automated distribution of an electronic document within the data processing system.

It is yet another object of the present invention to provide an improved data processing system which permits the automated distribution of an electronic document in accordance with a stored indication of the functional area of that document.

The foregoing objects are achieved as is now described. The method and apparatus of the present invention permit the automated distribution of an electronic document to a preselected list of recipients. A selected document is identified and a document profile is selected or created, including an identification of the technical or functional area disclosed within that document. An examination of the document profile is then utilized to determine a preselected group of recipients and the document is automatically transmitted to those recipients. In one embodiment of the present invention, the creator of each document is prompted to select one or more functional areas from a predetermined list of functional areas during the creation of a document. In still another embodiment, the functional area of a document is automatically established in response to an examination of the department number, division, building, laboratory group, et cetera associated with the creator or creators of the document.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A and 4B depict pictorial representations of computer screens which may be utilized to prompt a computer user to create an invention disclosure document and to select a functional area identification in accordance with the method and apparatus of the present invention.

DETAILED DESCRIPTION OF PREFERRED EMBODIMENT

Figure 1:
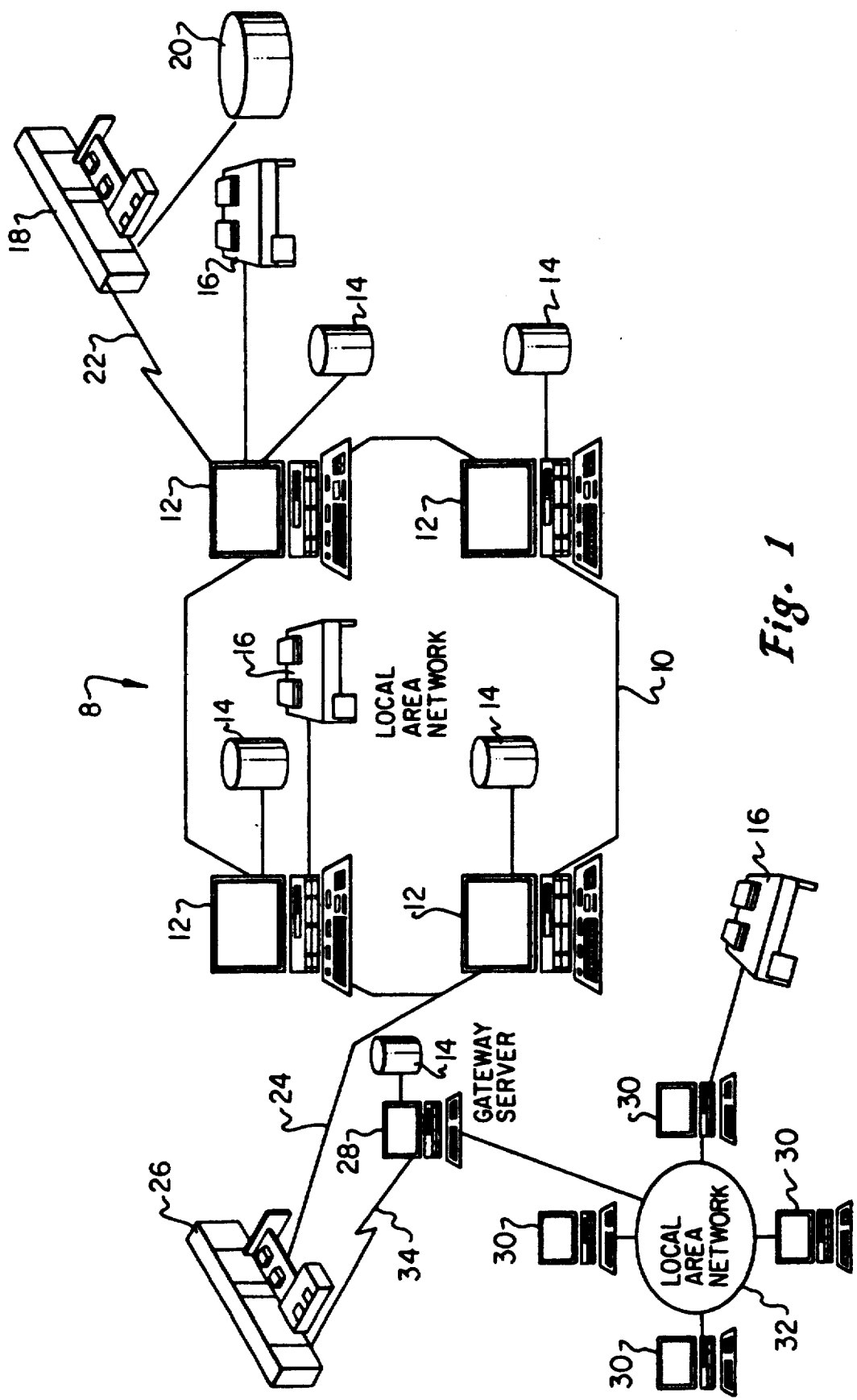
FIG. 1 is a pictorial representation of a distributed data processing system which may be utilized to implement the method of the present invention.

With reference now to the figures and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various documents which may be periodically accessed, processed and/or transmitted by a user within data processing system s, and thereafter distributed in accordance with the method of the present invention. In a manner well known in the prior art, each such document may be stored within a storage device 14 which is associated with a Resource Manager or Library Service, which is responsible for maintaining and updating all documents associated therewith.

Still referring to FIG. 1, it may be seen that data processing network 8 also include multiple central computer systems, such as central computer system 18, which may be preferably coupled to Local Area Network (LAN) 10 by means of communications link 22. In the preferred embodiment, central computer system 18 is an IBM System/370, although other computer systems, such as an IBM Application System/400 or PS/2 could also be used. In addition, central computer system 18 is not necessary if one or more local area networks are sufficient to connect all desired users. Central computer system 18 may also be coupled to a storage device 20 which may also serve as remote storage for Local Area Network (LAN) 10. Similarly, Local Area Network (LAN) 10 may be coupled via communications link 24 through a subsystem control unit/communications controller and communications link 34 to gateway server 28. Gateway server 28 is preferably an individual computer or Interactive Work Station (IWS) which serves to link Local Area Network (LAN) 32 to Local Area Network 10 such that electronic mail messages may be easily transmitted and received between individuals within either network.

As discussed above with respect to Local Area Network (LAN) 32 and Local Area Network (LAN) 10, a plurality of documents may be stored within storage device 20 and controlled by central computer system 18, as Resource Manager or Library Service for the documents thus stored. Of course, those skilled in the art that central computer system 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California, while Local Area Network (LAN) 10 may be located in Texas and central computer system 18 may be located in New York.

As will be appreciated upon reference to the foregoing, it is often desirable for users within one portion of distributed data processing network 8 to be able to create or select a document for transfer to other users within data processing network 8. This is generally accomplished utilizing any suitable software application which permits documents, notes or other collections of data to be transmitted or received throughout data processing network 8. Examples of such applications are PROFS, OfficeVision, or CMS note facility used by IBM computers. In the case of invention disclosure documents or other similar documents, the method and apparatus of the present invention will permit an electronic corroboration of such documents to be obtained at a subsequent time.

Figure 2:
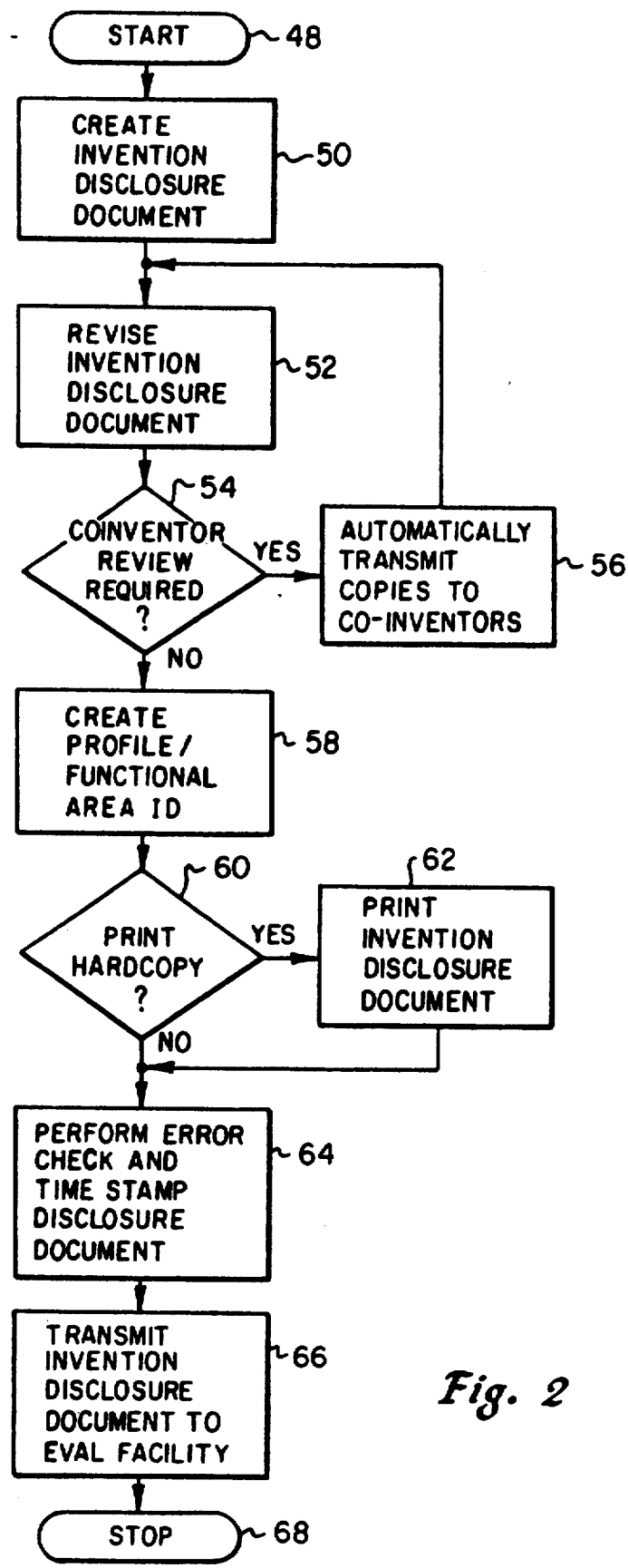
FIG. 2 is a high level flow chart depicting the creation of an electronic invention disclosure document which may be automatically distributed in accordance with the method and apparatus of the present invention.

Referring now to FIG. 2, there is depicted a high level flow chart which illustrates the creation of an electronic invention disclosure document which may be automatically distributed in accordance with the method and apparatus of the present invention. As is illustrated, the process begins at block 48 and thereafter passes to block 50 which depicts the creation of an invention disclosure document. In the preferred embodiment, the user is prompted for personal information about each inventor, critical dates information about statutory bar dates, and information about the problem solved and the solution. Next, block 52 gives the user the opportunity to revise the invention disclosure document, if such revision is necessary. Block 54 depicts a determination of whether or not co-inventor review is required and if so, the process passes to block 56 which illustrates the automatic transmission of copies of the invention disclosure document to each listed co-inventor. Next, the process returns to block 52 to illustrate the review and revision of the invention disclosure document based upon input from one or more co-inventors.

If, as a result of the determination illustrated in block 54, no additional co-inventor review is required, or all co-inventors have reviewed the invention disclosure document, then the process passes to block 58 which depicts the creation of a document profile/functional area identification. For purposes of this disclosure, the term "document profile" shall mean a collection of data which includes an identification of a functional area associated with an electronic document such as an invention disclosure document. Those skilled in the art will appreciate that the creation of this profile may be accomplished coincident with the creation of the invention disclosure by providing a form document which includes one or more data entry blanks which permit the creator of the document to identify the document by subject matter, author and functional area. Alternatively, as discussed herein, the creator of an invention disclosure document may be presented with a menu screen which lists multiple functional areas from which the document creator may select an appropriate listing. Similarly, a functional area identification may be automatically assigned in response to an examination of personal information inputted for each inventor, such as department number, division, building, et cetera, by correlating the employee's division or department with a functional area identification.

Next, block 60 illustrates a determination of whether or not it is desired to create a hard copy of the invention disclosure document. If so, the process passes to block 62 which depicts the printing of a hard copy of the invention disclosure document. At this point, block 64 depicts the determination of whether or not the invention disclosure document is now in final form and ready to be submitted to an evaluation facility by the performance of an automated error check to determine if all required data for a complete invention disclosure document has been entered. A date/time stamp is also automatically assigned to each invention disclosure document to assist in the management and corroboration of such documents. Thereafter, block 66 illustrates the transmission of the invention disclosure document to an evaluation facility and the process terminates, as depicted in block 68.

While the method and apparatus of the present invention will find application in the automated distribution of any electronic document, the illustrated example discloses the distribution of invention disclosure documents. Accordingly, the revised invention disclosure document and its associated profile/functional area identification information will thereafter be transmitted to an intellectual property law facility for further processing.

In alternate embodiments of the present invention wherein the electronic document to be distributed is a suggestion, the preceding description is also applicable; however, the term "inventor" should be replaced by "suggestor." Further processing of a suggestion will be done by a suggestion evaluation facility, rather than an intellectual property law facility as described herein.

Referring again to FIG. 1, it should be apparent to those skilled in the art that an evaluation facility for such documents may be located at any point within data processing network 8. Often a centralized evaluation facility is utilized for such documents; however, many large corporate entities utilize a decentralized evaluation facility wherein all invention disclosure documents from a particular geographic area are routed to a local evaluation facility.

Figure 3:
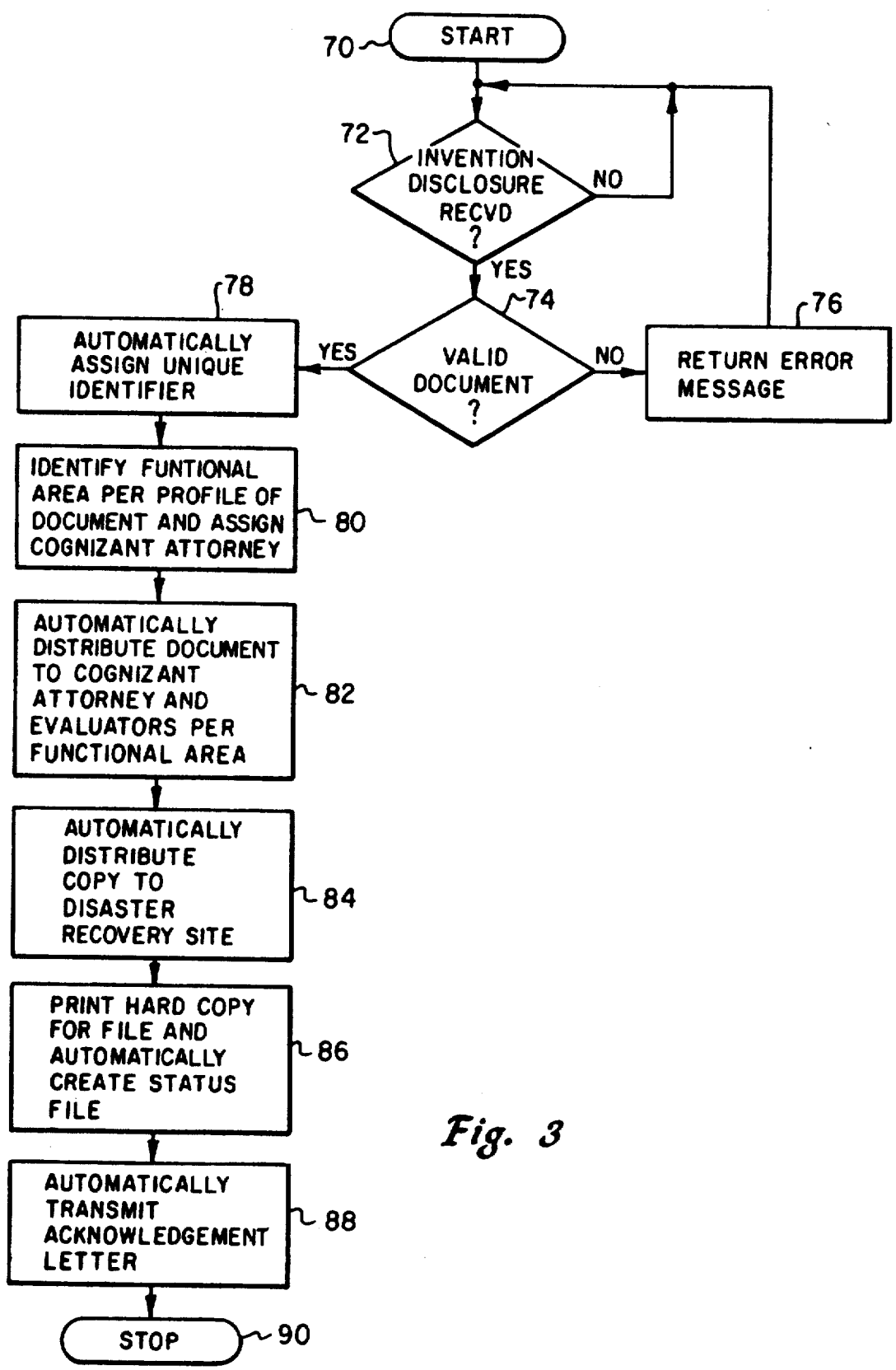
FIG. 3 is a high level flow chart depicting the automatic distribution of an electronic invention disclosure document which was created in accordance with the method and apparatus of the present invention.

With reference now to FIG. 3, there is illustrated a high level flow chart which depicts the automatic distribution of an electronic invention disclosure document for evaluation and corroboration, in accordance with the method and apparatus of the present invention. As is depicted, this process begins at block 70 and thereafter passes to block 72 which illustrates a determination of whether or not an invention disclosure document has been received at the evaluation facility. If not, the process merely iterates until such time as this event occurs. After receiving an invention disclosure document at the evaluation facility, block 74 depicts the determination of whether or not the document received is a valid invention disclosure document. That is, whether or not the invention disclosure document is organized in the desired format and includes all required information. If the document received is not valid, an error message is generated, as illustrated in block 76, and the process returns to block 72 to await the receipt of a subsequent invention disclosure document. Next, block 78 depicts the automatic assigning of a unique identifier, such as a disclosure number, to be associated thereafter with the invention disclosure document. In the preferred embodiment, the disclosure number includes an indication of the year the disclosure was received and a four digit number beginning at "0001" and sequentially incrementing each time a new disclosure is received.

At this point, block 80 illustrates the identification of the functional area for the invention disclosure document from the profile information contained with the document and the automatic assignment of a cognizant attorney. Thereafter, block 82 illustrates the automatic distribution of the invention disclosure document to the cognizant attorney and one or more preselected evaluators, determined in accordance with the functional area information contained within the document profile which was developed as discussed herein. This is accomplished by automatically creating a distribution list of appropriate evaluators, along with corresponding electronic addresses, in response to the aforementioned functional area information. In this manner, an invention disclosure document may be efficiently and automatically distributed to a plurality of evaluators for a determination as to the eventual status of the invention disclosure document.

Block 84 then illustrates the automatic distribution of a copy of the invention disclosure document to a disaster recovery site. In this manner, should a fire, earthquake, flood, or other disaster befall the facility which has been utilized to store an invention disclosure document, a copy of that document may be retrieved from a designated disaster recovery site.

Next, block 86 depicts the printing of a hard copy of the invention disclosure document for use in paper files and the automatic creation of a status file to be associated with the uniquely identified invention disclosure document. This status file may be utilized to provide a method for determining the status of an invention disclosure document at any given time. For example, the status file will typically contain the date upon which an invention disclosure document was distributed for evaluation, the dates each evaluator returned a response and any dates which must be met to preserve patentability.

Thereafter, block 88 illustrates the automatic transmission of an acknowledgement letter. Acknowledgement letters are typically sent to the inventors of each invention disclosure document and their management indicating that the document has been received at the evaluation facility and that the document has been distributed for evaluation. Thereafter, this process terminates, as illustrated in block 90.

Referring now to FIGS. 4A and 4B, there are depicted pictorial representations of two computer screens which may be utilized to prompt a computer user to create an invention disclosure document and to select a functional area identification in accordance with the method and apparatus of one embodiment of the present invention. As depicted in FIG. 4A, computer screen 92 includes a column 94 which prompts the computer user to enter the full names of all inventors for a particular invention disclosure document. Columns 96 permit the user to enter each inventor's employee serial number, division/department number, building number, location and telephone number. This information may be utilized, as will be explained in greater detail herein, to automatically determine a functional area to be associated with the invention disclosure document in another embodiment of the present invention.

Column 98 is for use by the evaluation facility, in the case of the depicted embodiment, a patent or intellectual property law operation. Column 98 permits the evaluation facility to assign a unique disclosure number, a cognizant patent attorney, and to enter information regarding the evaluator or evaluators who are automatically selected in accordance with the method and apparatus of the present invention.

Sections 114 permit the user to enter a title of the invention disclosed in this document and a short summary of the problem which is solved by the invention.

Next, in accordance with an important feature of the present invention, block 116 permits the entry of a functional code. As will be disclosed herein, this functional code entry may be input by the user or may be automatically selected from information which is available or input with regard to the inventors listed under column 94.

Finally, section 118 of computer screen 92 permits the user to enter various items of information which are useful in processing an invention disclosure document. For example, whether or not there has been a public demonstration or use, whether the invention has been disclosed outside the company, and whether or not the invention is utilized in a current manufacturing process.

Referring now to FIG. 4B, there is depicted a computer screen 100 which includes line 102 which prompts the computer user to select one functional area for each inventor listed on an invention disclosure document. Below line 102 are columns 104 and 108 which list a two digit code which may be utilized to identify a particular functional area. Columns 106 and 110 list a description which is associated with each two digit code listed within columns 104 and 108. Finally, line 112 prompts the computer user to select the code 00 if none of the functional area descriptions is appropriate.

Upon reference to the foregoing those skilled in the art will appreciate that it is a simple manner to prompt a computer user during the creation of an invention disclosure document by the utilization of a computer screen such as the screen depicted at reference numeral 100. By automatically providing a prompting screen, such as the screen depicted, the creator of an invention disclosure document is urged to select a functional area identification which may then be utilized to automatically distribute the invention disclosure document in accordance with the method described herein.

Figure 5:
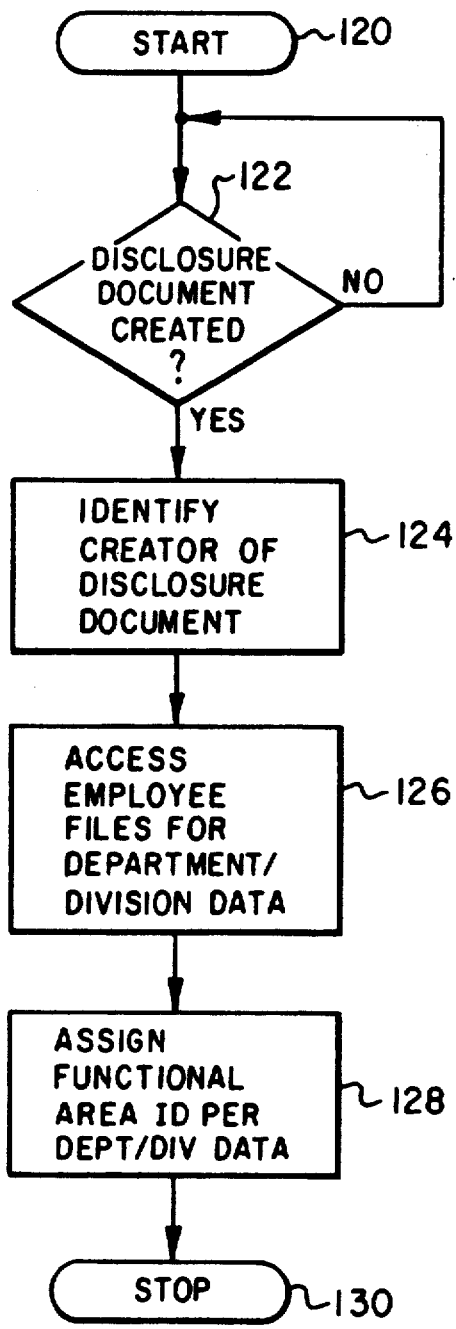
FIG. 5 is a high level flow chart depicting the automatic determination of a functional area identification in accordance with the method and apparatus of the present invention.

Finally, with reference to FIG. 5, there is depicted a high level flow chart which illustrates the automatic determination of a functional area identification in accordance with an alternate embodiment of the method and apparatus of the present invention. As depicted, the process begins at block 120 and thereafter passes to block 122 which illustrates a determination of whether or not a disclosure document has been created. If not, the process merely iterates until such time as a disclosure document is created.

Upon a determination that a disclosure document has been created, as illustrated in block 122, block 124 depicts the identification Of the creator of the disclosure document. This may be accomplished simply and easily by requiring the creator of an invention disclosure document to enter his or her name and employee number in appropriate blanks in the document as it is created. Next, block 126 illustrates the accessing of the employee files for a determination of department/division data for the creator of the disclosure document. Of course, those skilled in the art will appreciate that in various corporate entities, the terms "department" and "division" may not be utilized and substitute terms may be appropriate. In either event the method and apparatus of the present invention presumes that a computer based employee file is available for the organization in question and that individuals within the organization are sorted within those files in accordance with functional areas.

Next, block 128 illustrates the assigning of a functional area identification for an invention disclosure document in accordance with the department/division data obtained from employee files. In cases where more than one co-inventor are listed as the creators of an invention disclosure document, it is a simple matter to program the function of block 128 to access a preselected deadlock mechanism to resolve the assignment of a functional area identification when different departments and/or divisions are involved. For example, in cases of multiple creators of an invention disclosure document the functional area identification may be derived from an analysis of where most of the creators are employed within the organization. Alternatively, the document itself may list creators in a hierarchical fashion and the functional area identification may be that area associated with the first listed creator. Finally, this process terminates, as illustrated in block 130.

Upon reference to the foregoing those skilled in the art will appreciate that the Applicants in the present application have provided a method and apparatus whereby an electronic document, such as an invention disclosure document or suggestion, may have automatically assigned to it a functional area identification which may be subsequently utilized to automatically distribute that document to a preselected distribution list of evaluators or computer users. In this manner, the evaluation or distribution of an electronic document may be efficiently carried out without the necessity of human intervention.

While the invention has been particularly shown and described with reference to a preferred embodiment, it will be understood by those skilled in the art that various changes in form and detail may be made therein without departing from the spirit and scope of the invention.

We claim:

1. A method in a data processing system having a plurality of users enrolled therein, each of said plurality of users having associated personnel information stored within said data processing system, for the automatic distribution of invention disclosure documents created by selected ones of said plurality of users and stored within said data processing system, said method comprising the steps of:

identifying at least one invention disclosure document within said data processing system;

automatically identifying at least one selected user among said plurality of users within said data processing system as a creator of said at least one invention disclosure document;

automatically accessing personnel information associated with said at least one selected user within said data processing system;

creating an invention disclosure document profile associated with said at least one invention disclosure document, said invention disclosure document profile including a characterization of said at least one invention disclosure document derived from a functional technical area associated with said at least one selected user in response to said accessing of said associated personnel information; and automatically transmitting said at least one invention disclosure document to a preselected group of said plurality of users enrolled in said data processing system for evaluation in response to said associated invention disclosure document profile.

2. A data processing system having a plurality of users enrolled therein, each of said plurality of users having associated personnel information stored within said data processing system, for the automatic distribution of invention disclosure documents created by selected ones of said plurality of users and stored within said data processing system, said data processing system comprising:

means for identifying at least one invention disclosure document within aid data processing system;

means for automatically identifying at least one selected user among said plurality of users within said data processing system as a creator of said at least one invention disclosure document;

means for automatically accessing personnel information associated with said at least one selected user within said data processing system;

means for creating an invention disclosure document profile associated with said at least one invention disclosure document, said invention disclosure document profile including a characterization of said at least one invention disclosure document derived from a functional technical area associated with said at least one selected user in response to said accessing of said associated personnel information; and means for automatically transmitting said at least one invention disclosure document to a preselected group of said plurality of users enrolled in said data processing system for evaluation in response to said associated invention disclosure document profile.

3. A method in a data processing system having a plurality of users enrolled therein, each of said plurality of users having associated personnel information stored within said data processing system, for the automatic distribution of suggestion documents created by selected ones of said plurality of users and stored within said data processing system, said method comprising the steps of:

identifying at least one invention disclosure document within said data processing system;

automatically identifying at least one selected user within said data processing system as a creator of said at least one suggestion document;

automatically accessing personnel information associated with said at least one selected user within said data processing system;

creating a suggestion document profile associated with said at least one suggestion document, said suggestion document profile including a characterization of said at least one suggestion document derived from a functional technical area associated with said at least one selected user in response to said accessing of said associated personnel information; and automatically transmitting said at least one suggestion document to a preselected group of said plurality of users enrolled in said data processing system for evaluation in response to said suggestion document profile.

* * * * *